(12) United States Patent
Basant et al.

(10) Patent No.: US 9,557,997 B2
(45) Date of Patent: Jan. 31, 2017

(54) CONFIGURABLE LOGIC CONSTRUCTS IN A LOOP BUFFER

(71) Applicant: Oracle International Corporation, Redwood Shores, CA (US)

(72) Inventors: Aarti Basant, Santa Clara, CA (US); Brian Gold, Redwood City, CA (US); Erik Schlanger, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 533 days.

(21) Appl. No.: 13/947,674

(22) Filed: Jul. 22, 2013

(65) Prior Publication Data

US 2015/0026434 A1    Jan. 22, 2015

(51) Int. Cl.
*G06F 9/30* (2006.01)

(52) U.S. Cl.
CPC .................. *G06F 9/30065* (2013.01)

(58) Field of Classification Search
CPC ........................................................ G06F 9/38
See application file for complete search history.

(56) References Cited

U.S. PATENT DOCUMENTS

| | | | |
|---|---|---|---|
| 6,047,081 A | 4/2000 | Groezinger et al. | |
| 6,745,174 B2 | 6/2004 | Levy et al. | |
| 6,826,522 B1 | 11/2004 | Moller et al. | |
| 6,898,693 B1 * | 5/2005 | Singh | G06F 9/381 |
| | | | 712/205 |
| 7,047,252 B2 | 5/2006 | Buch et al. | |
| 7,991,794 B2 | 8/2011 | Bedi et al. | |
| 8,049,760 B2 | 11/2011 | Jiao et al. | |
| 8,260,803 B2 | 9/2012 | Hsu et al. | |
| 8,285,709 B2 | 10/2012 | Candea et al. | |
| 8,533,216 B2 | 9/2013 | Buger et al. | |
| 8,543,534 B2 | 9/2013 | Alves et al. | |
| 8,725,707 B2 | 5/2014 | Chen et al. | |
| 8,938,644 B2 | 1/2015 | Clark et al. | |
| 8,996,463 B2 | 3/2015 | Merriman et al. | |

(Continued)

FOREIGN PATENT DOCUMENTS

EP    1 111 500 A1    3/1996

OTHER PUBLICATIONS

Weinhardt, Markus, "Compilation and Pipeline Synthesis for Reconfigurable Architectures", 1997, 8 pages.

(Continued)

*Primary Examiner* — Cheng-Yuan Tseng
(74) *Attorney, Agent, or Firm* — Hickman Palermo Becker Bingham LLP (57) ABSTRACT

Techniques are described herein for using configurable logic constructs in a loop buffer. In an embodiment, a configurable hardware block is programmed based on one or more target functions within a loop. The configurable hardware block is associated with a plurality of registers, including a loopcount register and a first output register. For each iteration of the loop, a counter value in the loopcount register is updated and a target value in the first output register is updated using the programmed configurable hardware block. For each iteration of the loop, a set of one or more instructions may be fetched from the instruction buffer and executed based on the updated target value in the first output value.

30 Claims, 4 Drawing Sheets

(56) References Cited

U.S. PATENT DOCUMENTS

2008/0294882 A1* 11/2008 Jayapala ............ G06F 9/325
   712/241
2009/0037700 A1   2/2009 Graham
2014/0095748 A1   4/2014 Aingaran et al.

OTHER PUBLICATIONS

Schmit et al., "PipeRench: A Virtualized Programmable Datapath in 0.18 Micron Technology", dated 2002, 4 pages.
Park et al., "Polymorphic Pipeline Array: A Flexible Multicore Accelerator with Virtualized Execution for Mobile Multimedia Applications", Dated Dec. 12, 2009 11 pages.
Silva et al., "Using a Tighly-Coupled Pipeline in Dynamically Reconfigureable Platform FPGAs", dated May 2003, 4 pages.
Dynamic Scheduling Techniques, http://www.cs.iastate.edu/~prabhu/Tutorial/PIPELINE/dynamSchedTech.html, printed on Jul. 4, 2012, 2 pages.
CCCP: Accelerator Virtualization, http://cccp.eecs.umich.edu/research/virtual.php, printed on Jul. 4, 2012, 3 pages.
U.S. Appl. No. 13/789,524, filed Mar. 7, 2013, Notice of Allowance, Oct. 19, 2015.

* cited by examiner

CONFIGURABLE LOGIC CONSTRUCTS IN A LOOP BUFFER

CROSS-REFERENCE TO RELATED APPLICATIONS

This application is related to application Ser. No. 13/789,524, filed Mar. 7, 2013 the entire contents of which is hereby incorporated by reference as if fully set forth herein.

FIELD OF THE INVENTION

The present disclosure relates generally to techniques for optimizing loop execution and, more specifically, to techniques for using configurable logic constructs during loop execution.

BACKGROUND

Many applications spend a large percentage of time in small kernels of instructions that are executed in tight loops. Loop buffers may optimize loop execution in processors that have limited instruction cache and strict power limitations. Specifically, the code kernels that are executed in tight loops are loaded in a loop buffer that is usually much smaller than the instruction cache. Hence, the energy and overhead in fetching instructions is reduced when the loop buffer is utilized. This makes loop buffers useful in power efficient architectures targeted to execute applications that have identified the loop kernels. However, loop buffers are typically very small, limiting their support of code expansion that occurs with loop unrolling.

For example, the tables below illustrate different approaches for evaluating a loop. Table 1 includes an example code snippet that converts all bits in input-integer into bytes in array output_array.

TABLE 1

| C-Code snippet |
| --- |
| for (i=31; i>=0; i--){<br>    output_array[i] = input_integer & (1 << i);<br>} |

Table 2 below illustrates an example assembly snippet, herein referred to as the "original assembly snippet." This assembly snippet may be generated by compiling the code snippet in Table 1. No loop unrolling or loop buffer is used, resulting in extra instructions to track the number of iterations and to execute the conditional branch.

TABLE 2

| Original assembly snippet | |
| --- | --- |
| mov $r0, 31 | ## $r0 = 31 |
| ld $r1, &input_integer | ## $r1 = input_integer |
| L1: | |
| shll $r2, 1, $r0 | ## $r2 = 1<<i |
| and $r3, $r1, $r2 | ## $r3 = input_integer & (1 << i) |
| str r3, output_array[$r0] | ## output_array[i] = $r3 |
| sub $r0, $r0, 1 | ## i--; |
| jge %r0, 0, L1 | ## if i>=0 iterate through loop again |

Tables 3 and 4 below illustrate alternative assembly snippets generated from the same code snippet. Table 3 exploits loop unrolling resulting in code-size expansion, and Table 4 exploits a loop buffer. By expanding the code as illustrated in Table 3, the instructions for tracking the number of iterations in the loop and evaluating the conditional branch may be eliminated. However, such code may be too large to be stored in a loop buffer.

TABLE 3

| Assembly snippet that exploits loop unrolling | |
| --- | --- |
| ld $r1, &input_integer | ## $r1 = input_integer |
| and $r3, $r1, #0x80000000 | ## $r3 = input_integer & (1 << 31) |
| str r3, output_array[#31] | ## output_array[31] = $r3 |
| and $r3, $r1, #0x40000000 | ## $r3 = input_integer & (1 << 30) |
| str r3, output_array[#30] | ## output_array[30] = $r3 |
| and $r3, $r1, #0x20000000 | ## $r3 = input_integer & (1 << 29) |
| str r3, output_array[#29] | ## output_array[29] = $r3 |
| : | |
| : | |
| and $r3, $r1, #0x00000001 | ## $r3 = input_integer & (1 << 0) |
| str r3, output_array[#0] | ## output_array[0] = $r3 |

In Table 4, $r0 is the LOOPCOUNT register and is auto decremented by loop buffer hardware. The loop is completed when $r0 reaches 0. The number of instructions in this example compared to loop unrolling is significantly reduced, which facilitates storage in a loop buffer when space is limited.

TABLE 4

| Assembly snippet that exploits loop buffer | |
| --- | --- |
| mov $r0, 32 | ## $r0 = number of iterations = 32 |
| ld $r1, &input_integer | ## $r1 = input_integer |
| mov $r5, 31 | ## $r5 = i = 31 |
| loopstart $r0 | |
| shll $r2, 1, $r5 | ## $r2 = 1<<i |
| and $r3, $r1, $r2 | ## $r3 = input_integer & (1 << i) |
| str r3, output_array[$r5] | ## output_array[i] = $r3 |
| sub $r5, $r5, 1 | ## i--; |
| loopend | |

Table 5 illustrates the number of instructions executed in each representation of the code. The number of instructions that are executed may approximate the speed at which the code is executed. Accordingly, loop unrolling assembly was approximately 150% faster than the original assembly snippet while the assembly utilizing the loop buffer was approximately 25% faster than the original.

TABLE 5

| Comparison of assembly snippets | | | |
| --- | --- | --- | --- |
| | # of instructions executed in 1 iteration of loop. | # of instructions executed in 32 iteration of loop. | Speedup as compared to original assembly snippet |
| Table 2: Original Assembly snippet | 5 | 160 | 1 |
| Table 3: Assembly snippet that exploits loop unrolling | 2 | 64 | 2.5 |
| Table 4: Assembly snippet that exploits loop buffer | 4 | 128 | 1.25 |

As apparent from Table 5, loop unrolling may achieve greater speedup times than using a loop buffer. However, the loop unrolling assembly snippet does not take advantage of the reduced energy and overhead of fetching instructions provided by the assembly snippet that exploits the loop buffer. Although the loop unrolling may be used in conjunction with the loop buffer, the code expansion inherent in loop unrolling may overflow the loop buffer, reducing or negating the benefit of a loop buffer.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Various embodiments are illustrated by way of example, and not by way of limitation, in the figures of the accompanying drawings and in which like reference numerals refer to similar elements and in which.

DETAILED DESCRIPTION

Techniques are described herein for using configurable logic constructs in a loop buffer. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

According to embodiments described herein, a configurable hardware block is programmed with loop functions. The configurable hardware block is further associated with a plurality of registers, including a loopcount register, one or more input registers, and one or more output registers. During loop execution, a target value is updated in the output register using the programmed configurable hardware block. In addition, a counter value that tracks a number of iterations in the loop is updated in the loopcount register. The counter value may also be updated by the configurable hardware block per iteration or may be updated by other circuitry.

During loop execution, a set of instructions may be fetched from an instruction buffer per iteration of the loop. The instructions may be executed based on one or more updated target values stored in the output registers. By relying on the configurable hardware block to update the output registers, the number of instructions stored by the instruction buffer and executed each loop iteration may be significantly reduced, decreasing the storage overhead on the instruction buffer and the execution time of the loop.

System Architecture

Figure 1:
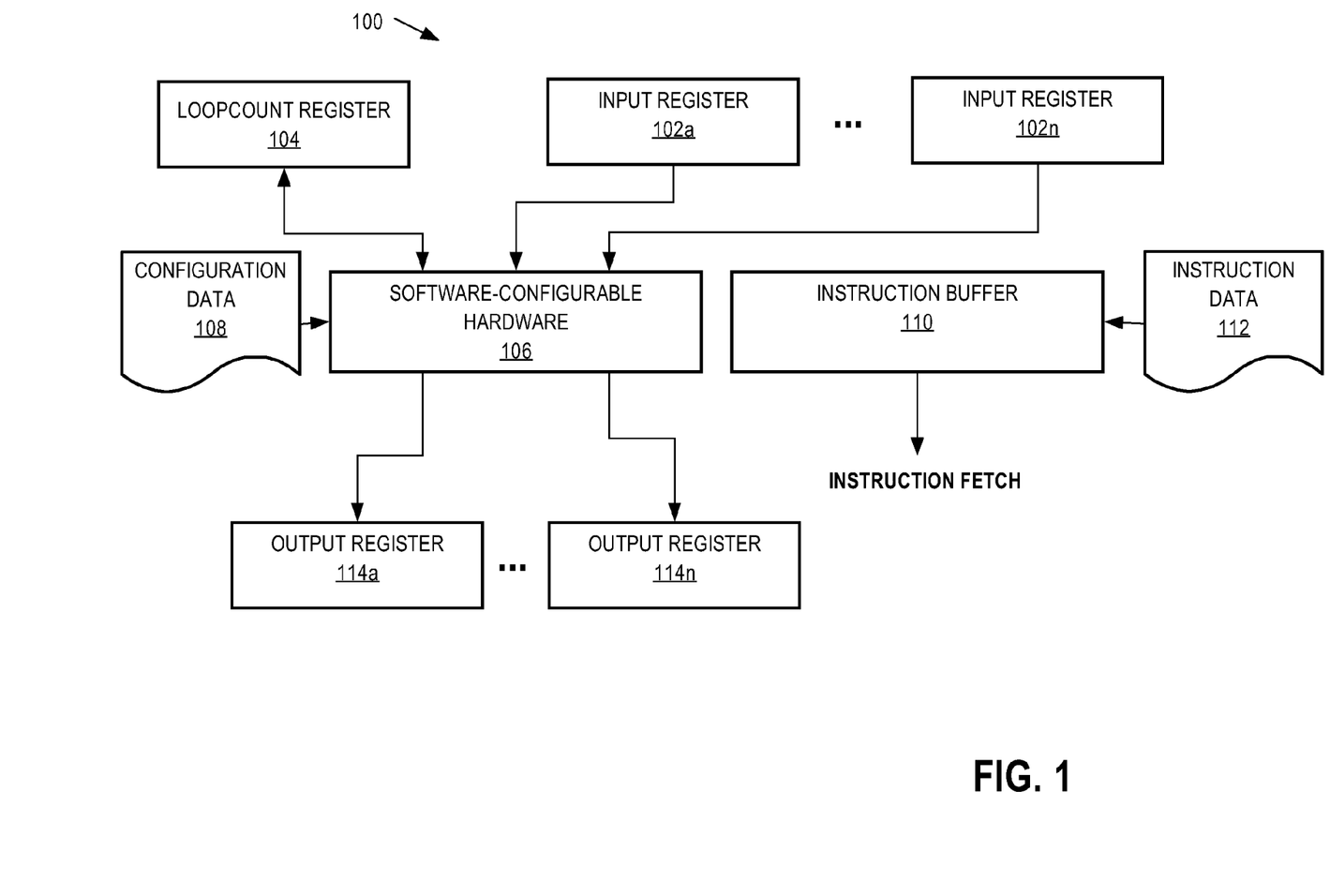
FIG. 1 is a block diagram depicting an example loop buffer with configurable logic constructs, according to an embodiment.

FIG. 1 is a block diagram depicting an example loop buffer with configurable logic constructs, according to an embodiment. System 100 generally comprises one or more input registers 102a to 102n, a loopcount register 104, configurable hardware block 106, configuration data 108, instruction buffer 110, instruction data 112 and output registers 114a to 114n.

Input registers 102a to 102n store input data that is provided to configurable hardware block 106. In an embodiment, each input register is associated with a different general purpose register (GPR) of a central processing unit (CPU). For example, a first input register may be associated with GPR $r0 and a second input register may be associated with GPR $r1. During loop execution, the input data is loaded from the associated GPRs into configurable hardware block 106.

Loopcount register 104 is an input register that tracks the number of iterations during a loop. This register may also be associated with a GPR of the CPU. Loopcount register 104 stores a counter that is automatically incremented or decremented for each iteration of a loop. Once the value in this register indicates that the loop has finished, the program flow exits the loop body.

Configurable hardware block 106 includes hardware logic that is reconfigurable by software. The underlying reconfigurable hardware constructs may vary from implementation to implementation. For example, configurable hardware block 106 may comprise a plurality of programmable logic blocks that are coupled together via a programmable interconnect. The logic blocks may comprise programmable look-up tables, logic gates, and/or arithmetic logic units. Configurable hardware block 106 receives configuration information from configuration data 108. Based on configuration data 108, configurable hardware block 106 configures the datapath between input registers 102a to 102n and output register 114a to 114n.

Configuration data 108 includes configuration information to program configurable hardware block 106. For example, configuration data 108 may comprise a bitstream that reconfigures a programmable interconnect to change how a plurality of logic blocks are connected. In another example, configuration data 108 may configure the lookup tables for a particular logic blocks to change the output of a given logic block for a given input. Thus, configuration data 108 may control and alter the datapath (i.e., the collection of functional units) between the input registers and the output registers.

Instruction buffer 110 is a buffer memory that stores a set of one or more instructions specified in instruction data 112. During loop execution, the CPU fetches the set of one or more instructions from instruction buffer 110 rather than fetching the instruction from main memory or an instruction cache. Instruction buffer 110 may be a smaller, faster memory cache than a typical instruction cache to minimize latency in fetching loop instructions.

Instruction data 112 comprises a set of one or more instructions that are part of an instruction set architecture (ISA). For example, instruction data 112 may include machine code that may be executed directly by a CPU. Accordingly, each instruction may comprise one or more opcode fields that identify a particular operation supported by the ISA. Each instruction may further comprise one or more other fields used to perform the particular operation.

Output registers 114a to 114n store output data generated by configurable hardware block 106 during loop execution. In an embodiment, each output register is associated with a different GPR. For example, a first output register may be associated with GPR $r2 and a second register may be associated with GPR $r3. During loop execution, the output data is loaded from the configurable hardware block 106 into the associated GPRs.

The associations between registers and the configurable hardware block 106 may be predefined in the hardware architecture or may be software-configurable, depending on the particular implementation. For example, GPRs may be communicatively coupled via a bus to the appropriate registers as dictated by the architecture. In another example, software instructions may be used to configure the connection between the GPRs and configurable hardware block 106.

The number of input and output registers may vary from implementation to implementation. In one embodiment, the number of registers is determined based on the code kernel that is executed by configurable hardware block 106. For example, if the code kernel generates one output from two inputs, then configurable hardware block 106 may use two GPRs for input and one GPR for output. Thus, the number of associated registers may be dynamically determined based on the number and type of loop operations performed by configurable hardware block 106.

Programming Configurable Constructs in a Loop Buffer

In an embodiment, software is used to program the configurable loop buffer based on one or more functions included in a loop. The functions that are programmed into the configurable loop buffer are herein referred to as "target functions." The target functions may include, without limitation, arithmetic operations, bitwise operations, and logical operations. For example, in the code snippet of Table 1, the loop may be broken down into multiple operations. One operation is the bitwise shift (1<<i), which shifts a bit to the left based on the loop count value. Another operation is the bitwise AND between input_integer and the result of the bitwise shift operation. Yet another operation is decrementing the current loop count to identify a location to store input_integer in the output array. The CPU may program configurable hardware block 106 to evaluate such target functions.

A compiler, such as an assembler, may be used to detect which functions within a loop body should be programmed into configurable hardware block 106 (i.e., which functions are target functions). The manner in which the functions are identified may vary from implementation to implementation. For example, the target functions may be explicitly specified as an assembly directive, such as illustrated in Table 6 below.

TABLE 6

Assembly snippet exploiting a loop buffer and a configurable hardware block The #CONFIG directive used in Table 6 acts as a mechanism that identifies the target functions and instructs how configurable hardware block 106 assigns values to output registers 114a to 114n.

| | |
|---|---|
| mov $r0, 32 | ## LOOP_HW_IN0 = $r0 = LOOPCOUNT = 32 |
| mov $r1, 1 | ## LOOP_HW_IN1 = $r1 = 1 |
| ld $r4, &input_integer | ## $r4 = input_integer |
| #CONFIG LOOP_HW_OUT0 = LOOP_HW_IN0 − LOOP_HW_IN1 //$r2 =#r0 −1 | |
| #CONFIG LOOP_HW_OUT1 = \ LOOP_HW_IN1 << (LOOP_HW_IN0 − LOOP_HW_IN1) //$r3 = 1<< ($r0 − 1) | |
| loopstart $r0 | ## $r0 shall auto decrement in each iteration. |
| and $r5, $r4, $r3 | ## $r5 = input_integer & (1 << i) |
| str r5, output_array[$r2] | ## output_array[i] = $r5 |
| loopend | |

The compiler translates the expressions specified by the #CONFIG directive into instructions for programming configurable hardware block 106. For example, the assembly code in Table 6 may be translated as follows: Input Register 0=LOOP_HW_IN0=$r0=number of iterations=32; Input Register 1=LOOP_HW_IN1=$r1=1; Output Register 0=LOOP_HW_OUT0=$r2=($r0−1); and Output Register 1=LOOP_HW_OUT1=$r3=$r1<<($r0−$r1).

During translation, the compiler generates configuration data 108 that is used to program configurable hardware block 106. In the example illustrated in Table 6, configuration data 108 may be used to program configurable hardware block 106 to decrement the value of $r0 and store the result in $r2. Similarly, configuration data 108 programs configurable hardware block 106 to perform a bitwise left-shift operation on the value stored in $r1 by ($r0−$r1) bits. The CPU may use configuration data 108 to program configurable hardware block 106 at assembly time, during program startup, or during program runtime, depending on the particular implementation.

The format of configuration data 108 may vary from implementation to implementation. In an embodiment, configuration data 108 is associated with a memory mapped special register. To reconfigure the logic within configurable hardware block 106, the CPU generates and stores a code in the special register. The code may be generated at compilation time and stored in the memory mapped register at runtime to dynamically program configurable hardware block 106. Each code uniquely identifies how the configurable hardware block 106 is setup and may be generated based on the target functions and the underlying constructs of configurable hardware block 106. For example, special register may be coupled to a plurality of multiplexors that control the interconnects and logical units within configurable hardware block 106. The code may comprise a set of bits that, when stored within the special register, enable or disable the appropriate multiplexors to perform the target logical expressions. A load from the memory mapped register may be performed to identify the current configuration of the hardware. Table 7 illustrates example instructions that may be executed by the CPU to program configurable hardware block 106 at runtime. By exposing expanded views of the loop count variable in the output register, the benefits of loop rolling may be achieved. The expanded views can be exposed by configuring the hardware appropriately. This is one sample use case of the configurable hardware.

TABLE 7

Assembly snippet for programming a loop buffer movi $r9, 0xABCD   /*Move code to GPR $r9.*/
st $r9, 0, mem_addr /* Store code to memory mapped mem_addr*/

In another embodiment, configuration data 108 is encoded in bitstream formats similar to the format used to configure field programmable gate arrays (FPGAs). The compiler generates the bitstream patterns for the target functions, such as those within the #CONFIG pragmas in the example above. The LOOPSTART instruction points to the address storing the bitstream. During runtime, the bitstream is used to configure the hardware logic at runtime.

In another embodiment, the CPU may support an extension to its instructions set architecture (ISA). The ISA extension may be invoked from the #CONFIG pragmas in the examples given above. For example, the CPU may execute an instructions such as isa_config special_config_reg_1 0xABCD to program a special purpose configuration register with a code that configures the hardware logic of configurable hardware block 106.

Referring again to Table 6, the loopstart instruction identifies the loopcount register. In the present example, $r0 is the loopcount register, which also serves as one of the input registers. Accordingly, in addition to tracking the number of iterations, the value in loopcount register 104 may be used to evaluate target functions and update one or more output registers. Alternatively, loopcount register 104 may be separate and independent of input registers 102a to 102n.

The instructions between the loopstart and loopend instruction identify the instructions that are loaded into instruction buffer 110. The instructions that are loaded into instruction buffer 110 are herein referred to as "target instructions." For example, Table 8 below illustrates the target instructions for the code snippet of Table 6.

TABLE 8

Target instructions for a loop buffer

| and $r5, $r4, $r3 | ## $r5 = input_integer & (1 << i) |
| str r5, output_array[$r2] | ## output_array[i] = $r5 |

In an alternative embodiment, the instruction "and $r5, $r4, $r3" may be programmed into configurable hardware block 106. For example, $r4 may be associated with a third input register labeled LOOP_HW_IN3. Table 9 then illustrates an alternative to the assembly snippet of Table 6. Thus, the number of instructions stored in instruction buffer 110 and executed per loop iteration is reduced, but the number of input registers is increased.

TABLE 9

Alterative assembly snippet for programming a loop buffer

| mov $r0, 32 | ## LOOP_HW_IN0 = $r0 = LOOPCOUNT = 32 |
| mov $r1, 1 | ## LOOP_HW_IN1 = $r1 = 1 |
| ld $r4, &input_integer | ## $r4 = input_integer |
| #CONFIG LOOP_HW_OUT0 = LOOP_HW_IN0 − LOOP_HW_IN1 //$r2 =#r0 −1 | |
| #CONFIG LOOP_HW_OUT1 = \ LOOP_HW_IN3 & (LOOP_HW_IN1 << (LOOP_HW_IN0 − LOOP_HW_IN1)) //$r3 = $r4 &(1<< ($r0 − 1)) | |
| loopstart $r0 | ## $r0 shall auto decrement in each iteration. |
| str r3, output_array[$r2] | ## output_array[i] = $r3 |
| loopend | |

In an embodiment, the compiler reserves the appropriate GPRs in programs that utilize loop buffers. For example, if the program includes a loopstart instruction, the compiler may allocate one or more CPU registers for use with the loop buffer. In the example illustrated in Table 6, the compiler would reserve GPRs $r0 to $r3. However, the number of registers reserved may vary depending on the particular implementation and may be based on the particular code kernel. In programs that utilize the configurable logic, (include the loopstart instruction), the reserved registers are not used while the loop body is being executed using the configurable constructs as these registers are reserved for use by the configurable loop buffer construct. However, programs that do not employ the loop buffer construct may use the reserved GPRs normally.

Runtime Execution of the Loop Using Configurable Constructs

During program runtime, system 100 is used to evaluate the target functions within the loop body. In every iteration of the loop, loopcount register 104 is automatically decremented or otherwise updated. In a similar fashion, configurable hardware block 106 updates output registers 114a to 114n in every iteration of the loop. The instructions stored in instruction buffer 110, if any, may then be fetched and executed based on the updated values in the output registers. An example of this process is illustrated below.

Figure 2:
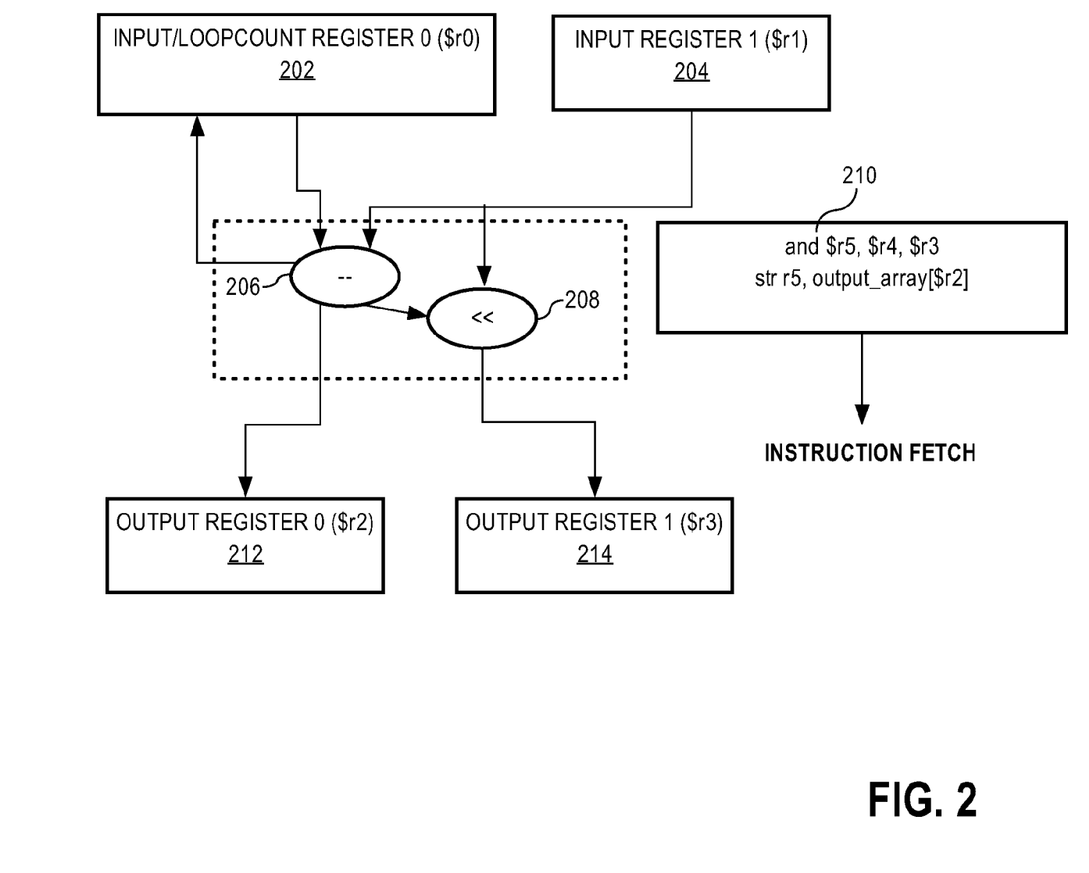
FIG. 2 is a block diagram depicting an example state of a loop buffer with configurable logic constructs, according to an embodiment.

FIG. 2 is a block diagram depicting a state of system 100 when executing the assembly snippet of Table 6. Before execution of the loop body, the registers are initialized, configurable hardware block 106 is programmed, and instructions data 112 is loaded into instruction buffer 110. For example, to initialize the loopcount register, the CPU executes the instruction "mov $r0, 32". This loads the number of iterations into loopcount register 104 (i.e., 32). Similarly, the CPU executes the instruction "mov $r1" to set the initial value of $r1.

Instructions 210 may be loaded into instruction buffer 110 at any time before loop execution. To load the instruction data, the CPU may execute a LOOP_BUFFER_LOAD instruction to start loading instructions from program memory into the loop buffer. In an alternative embodiment there is no explicit LOOP_BUFFER_LOAD instruction. Rather, after the LOOPSTART instruction is encountered, the processor uses loop buffer as a cache to program memory.

Configuration data 108 is used to program operators 206 and 208 into configurable hardware block 106. For example, a programmable interconnect may be configured such that input register 202 and 204 are connected to a first logical block corresponding to operator 206. The first logical block is programmed to subtract the value in input register 204 from input register 202 (i.e., $r0−$r1). The interconnect may further be programmed to store the result in output register 212 ($r2). The same result may also be used to update input register 202, which also serves as the loopcount register. In a similar manner, configuration data 108 may program the interconnect such that the result from the first logical block and the value in input register 204 are connected as input to a second logical block corresponding to operator 208. The second logical block is programmed to evaluate the expression $r1<<($r0−$r1). The result is stored in register $r3.

Once all registers are initialized, the instructions are loaded into the instruction buffer, and the hardware logic is configured, loop execution may begin. The target functions are performed for each iteration of the loop to update the respective output registers. For example, the value of output register 212 ($r2) would be 31 during the first iteration, 30 during the second iteration, and so forth. Similarly, the value of output register 214 ($r3) is updated each loop iteration.

After the output registers are updated for a particular loop iteration, the CPU fetches instructions 210 from instruction buffer 110 and executes these instructions in sequential order. The instructions are executed based on the updated values stored in the output registers. In the present example in Table 6, the instruction "and $r5, $r4, $r3" is fetched and executed followed by instruction "str r5, output_array[$r2]" for each iteration of the loop.

During each loop iteration, an iteration counter is updated in the LOOPCOUNT register. The logic for updating the LOOPCOUNT register may be programmed into configurable hardware block 106 or may be predefined circuitry separate from configurable hardware block 106, depending on the particular implementation. For example, predefined circuitry may increment or decrement the loop counter by one for each loop iteration. Alternatively, configuration data 108 may program configurable hardware block 106 to track the iteration count.

By programming configurable hardware block 106, a stride associated with the loop may change from loop to loop. For example, the loop in Table 6 has a unit stride where the loop counter is updated by one unit each iteration of the count. A second loop may have a non-unit stride, such as in the loop illustrated in Table 10 below.

TABLE 10

Loop with non-unit stride for (i=0; i<SIZE; i+=8) {
//Loop Body
}

For this loop, configurable hardware block 106 may be programmed using the directive illustrated in Table 11.

TABLE 11

Directive for programming configurable hardware to track loop iterations with non-unit stride $r9 = (SIZE&0x7)? ((SIZE>>3) + 1) : (SIZE>>3);
$LOOP_HW_IN0 = $r9;           // # of iterations
CONFIG $LOOP_HW_OUT0 =    //register tracking i.
$LOOP_HW_IN0 << 3;

Once the loop count value indicates that the loop has completed all of its iterations (e.g. LOOPCOUNT reaches 0), the program flow exits from the loop body. Hence, the CPU no longer fetches instructions from instruction buffer 110. The CPU may instead fetch the next instruction from main memory or some other program memory as indicated by the CPU's program counter.

Table 12 below compares the number of instruction executed in assembly when the loop buffer with a configurable hardware block is exploited as illustrated in FIG. 2 with the number of instructions executed for the other snippets of assembly code.

TABLE 12

Assembly snippet exploiting a loop buffer and a configurable hardware block

|  | # of instructions executed in 1 iteration of loop. | # of instructions executed in 32 iteration of loop. | Speedup as compared to original assembly snippet |
|---|---|---|---|
| Table 2: Original snippet | 5 | 160 | 1 |
| Table 3: Snippet that exploits loop unrolling | 2 | 64 | 2.5 |
| Table 4: Snippet that exploits loop buffer | 4 | 128 | 1.25 |
| Table 6: Snippet that exploits loop buffer with configurable hardware block | 2 | 64 | 2.5 |

Generating a Tree of Operators in the Configurable Constructs

Figure 3:
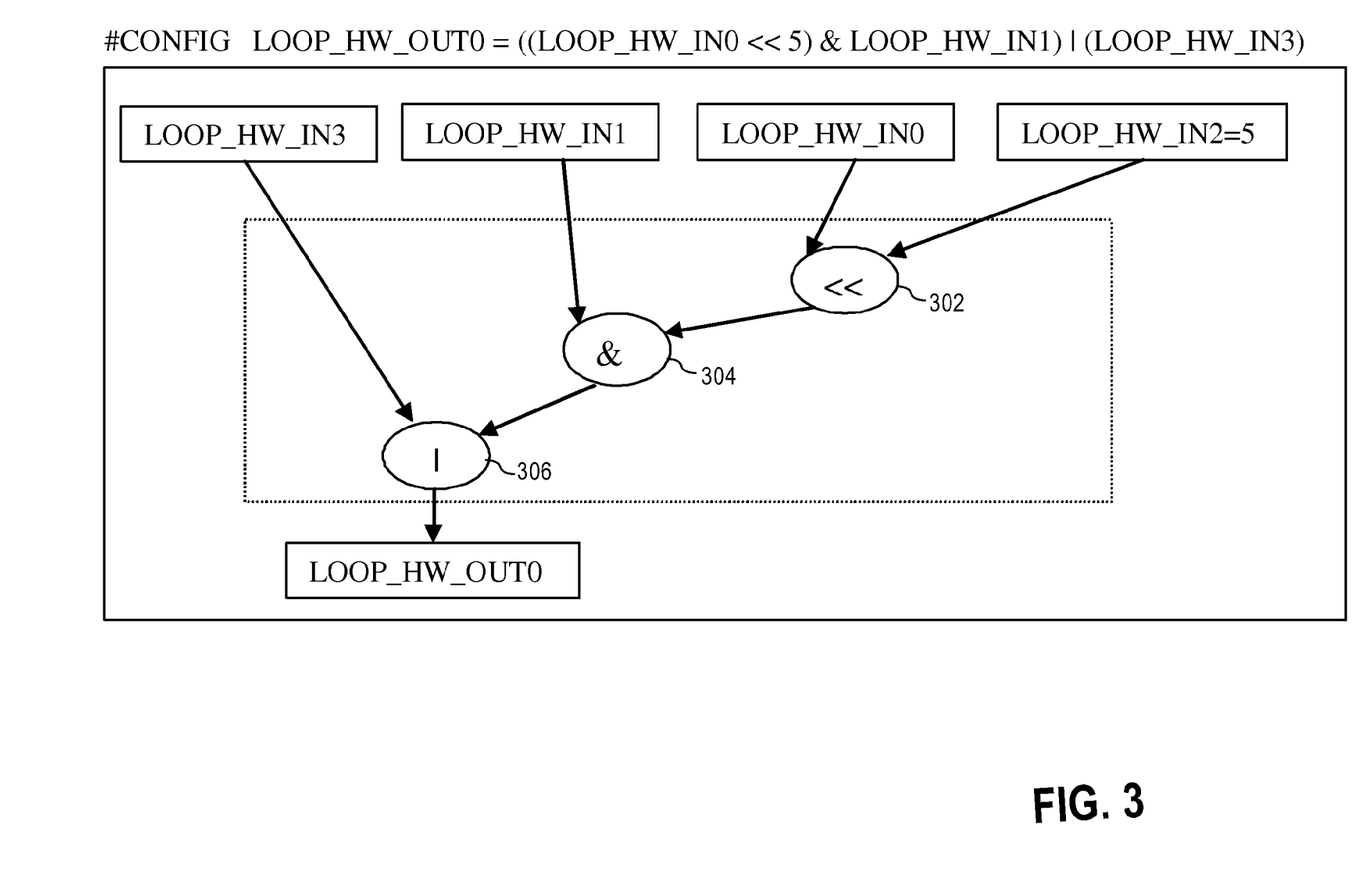
FIG. 3 is a block diagram depicting an example state of configurable logic constructs including a tree of operators, according to an embodiment.

Configurable hardware bock 106 may be programmed to form a tree of operators that are executed per loop iteration. Each operator in the tree corresponds to one or more target functions within a loop and may be implemented by a configurable logic block. For example, each configurable logic block may be programmed to perform an arithmetic operation, bitwise operation, or any other combinational logic function of a plurality of inputs to generate a particular result. The result of one operator may then be passed as input to one or more subsequent operators in the chain.

FIG. 3 is a block diagram depicting an example state of configurable logic constructs including a tree of operators, according to an embodiment. Based on the directive "#CONFIG LOOP_HW_OUT0=((LOOP_HW_IN0<<5) & LOOP_HW_IN1)|(LOOP_HW_IN3)", configurable hardware block 106 is programmed with a tree of operators, including operators 302, 304, and 306. Operator 302 receives input from register LOOP_HW_IN0 and LOOP_HW_IN2 and performs a left shift operation. The result of this operation and the value stored in register LOOP_HW_IN1 serve as input for operator 304. Operator 304 performs a bitwise AND operation to generate a second result. The second result and the value stored in LOOP_HW_IN3 serve as input to operator 306. This operator performs a bitwise OR operation to generate a final result, which is stored in register LOOP_HW_OUT0. Thus, the tree of operators 302, 304, and 306 are used to generate a final result. This tree is executed per loop iteration to update the final result stored in the output register.

Dual Purpose Registers

In some instances, a loop parameter that serves as input may be updated in each iteration of the loop, similar to the loop counter. For example, an input value may be multiplied by a scaling constant for each iteration of the loop. In such a case, a particular GPR may be associated with both an input and an output register. Continuing with the present example, an initial input value is loaded from the GPR into configurable hardware block 106 at the beginning of a loop iteration. Configurable hardware block 106 then applies the scaling constant to generate an output value, which is subsequently stored in the same GPR. This updated value is then used as input for the next iteration of the loop. This process continues until the program flow exits the loop.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or FPGAs that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
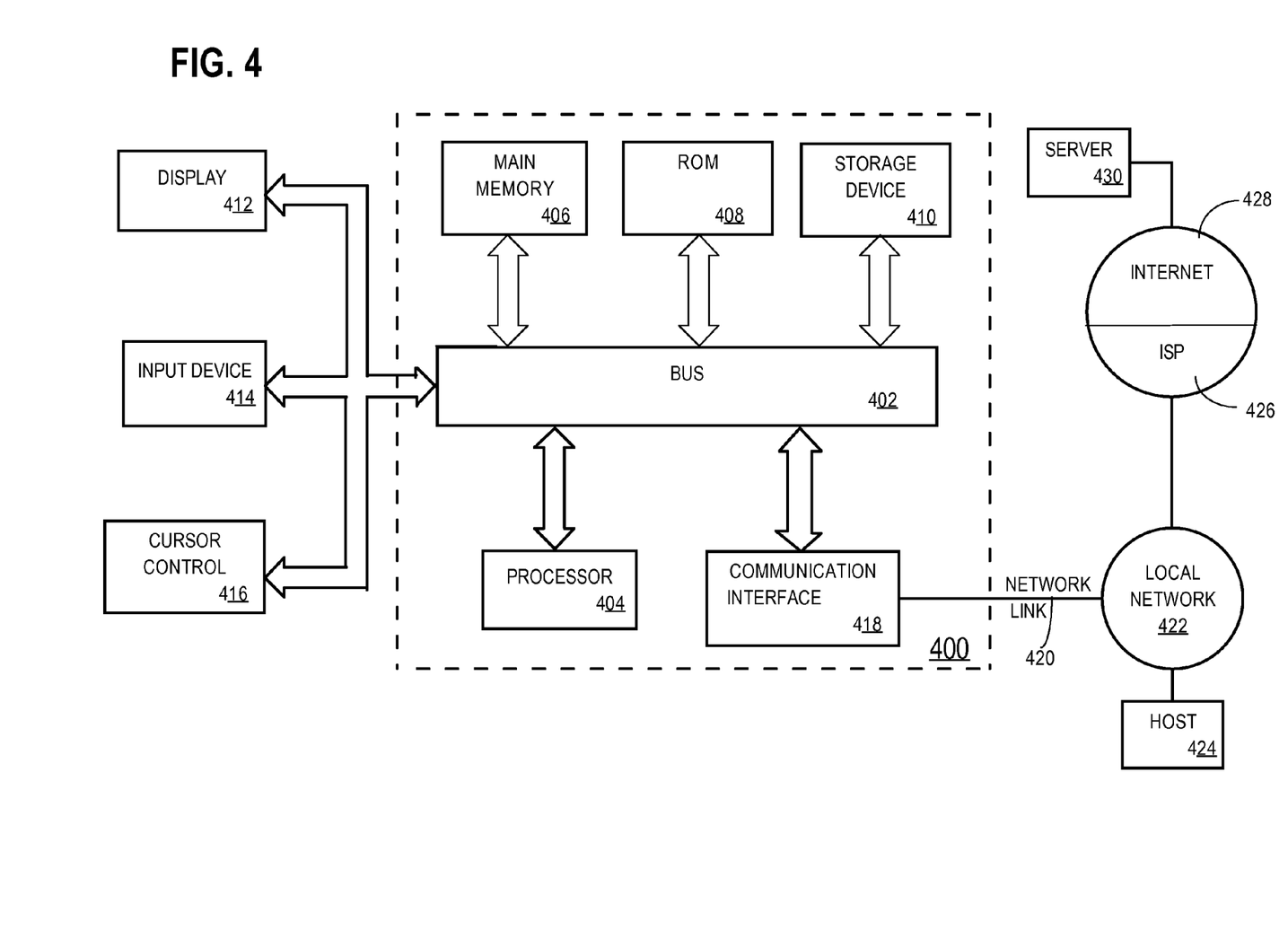
FIG. 4 is a block diagram depicting a computer system upon which an embodiment may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Processor 404 may include configurable loop constructs (not shown) for evaluating operations within a loop. The configurable loop constructs include software-configurable hardware, such as configurable hardware block 106, and may be in the pipeline of processor 404. Accordingly, instructions executing on processor 404 may generate configuration data to program target functions into the configurable hardware. The configurable loop constructs may further comprise an instruction buffer that stores one or more instructions within a loop that are native to processor 404. Processor 404 may fetch these instructions during loop execution.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method for executing a loop on a computing system, the method comprising:
    programming, into hardware of a configurable hardware block, a hardware circuit that performs one or more target functions within the loop, wherein programming reconfigures one or more of:
        a programmable interconnect to change how a plurality of logic blocks are connected,
        a lookup table, for a particular logic block, to change the output of the particular logic block for a given input, and
        a plurality of multiplexors and based on a particular value for a set of bits of a pre-defined plurality of acceptable values for the set of bits, wherein each value of the plurality of acceptable values designates a particular configuration of a pre-defined plurality of configurations of the plurality of multiplexors;
    wherein the configurable hardware block is associated with a plurality of registers;
    wherein the plurality of registers includes a loopcount register, an input register and an output register;
    for each iteration of the loop,
        (a) updating, in the loopcount register, a counter value that tracks a number of iterations in the loop; and
        (b) updating a target value in the output register based at least in part by loading a value from the input register into the hardware circuit of the programmed configurable hardware block.

2. The method of claim 1, further comprising:
    storing a set of one or more instructions within the loop in an instruction buffer;
    for each iteration of the loop,
        (a) fetching the set of one or more instructions from the instruction buffer; and
        (b) executing the set of one or more instructions based on the updated target value in the output register.

3. The method of claim 2, further comprising:
    determining, based on the counter value, that a program flow should exit the loop;
    in response to determining, based on the counter value, that the program flow should exit the loop, fetching a subsequent instruction in the program flow from a different location than the instruction buffer.

4. The method of claim 1, wherein the input register is the loopcount register.

5. The method of claim 1, wherein the input register provides at least one input value to the programmed configurable hardware block for each iteration of the loop.

6. The method of claim 1, wherein each register of the plurality of registers is a general purpose register (GPR) of a central processing unit (CPU) within the computing system; wherein updating, in the output register, a target value using the programmed configurable hardware block comprises updating the respective GPR.

7. The method of claim 1, wherein the plurality of registers further includes a second output register, the method further comprising updating, in the second output register, a second target value using the programmed configurable hardware block.

8. The method of claim 7, wherein the second target value is updated, based at least in part, on the value in the input register.

9. The method of claim 1, wherein programming a configurable hardware block based on one or more target functions within the loop comprises forming a tree of operators that are executed for each loop iteration; wherein the output of a first operator in the tree is used as input to a second operator in the tree.

10. One or more non-transitory computer-readable media storing instructions for executing a loop on a computer system, the instructions, in response to being executed by one or more processors, causing the computing system to perform operations comprising:
    programming, into hardware of a configurable hardware block, a hardware circuit that performs one or more target functions within the loop, wherein programming reconfigures one or more of:
        a programmable interconnect to change how a plurality of logic blocks are connected,
        a lookup table, for a particular logic block, to change the output of the particular logic block for a given input, and
        a plurality of multiplexors and based on a particular value for a set of bits of a pre-defined plurality of acceptable values for the set of bits, wherein each value of the plurality of acceptable values designates a particular configuration of a pre-defined plurality of configurations of the plurality of multiplexors;
    wherein the configurable hardware block is associated with a plurality of registers;
    wherein the plurality of registers includes a loopcount register, an input register and an output register;
    for each iteration of the loop,
        (a) updating, in the loopcount register, a counter value that tracks a number of iterations in the loop; and
        (b) updating a target value in the output register based at least in part by loading a value from the input register into the hardware circuit of the programmed configurable hardware block.

11. The non-transitory computer-readable media of claim 10, wherein the instructions further cause operations comprising:
    storing a set of one or more instructions within the loop in an instruction buffer;
    for each iteration of the loop,
        (a) fetching the set of one or more instructions from the instruction buffer; and
        (b) executing the set of one or more instructions based on the updated target value in the output register.

12. The non-transitory computer-readable media of claim 11, wherein the instructions further cause operations comprising:
    determining, based on the counter value, that a program flow should exit the loop;

in response to determining, based on the counter value, that the program flow should exit the loop, fetching a subsequent instruction in the program flow from a different location than the instruction buffer.

13. The non-transitory computer-readable media of claim 10, wherein the input register is the loopcount register.

14. The non-transitory computer-readable media of claim 10, wherein the instructions cause the input register to provide at least one input value to the programmed configurable hardware block for each iteration of the loop.

15. The non-transitory computer-readable media of claim 10, wherein each register of the plurality of registers is a general purpose register (GPR) of a central processing unit (CPU) within the computing system; wherein instructions for updating, in the output register, a target value using the programmed configurable hardware block comprise instructions for updating the respective GPR.

16. The non-transitory computer-readable media of claim 10, wherein the plurality of registers further includes a second output register, the instructions further causing operations comprising updating, in the second output register, a second target value using the programmed configurable hardware block.

17. The non-transitory computer-readable media of claim 16, wherein the second target value is updated, based at least in part, on the value in the input register.

18. The non-transitory computer-readable media of claim 10, wherein instructions for programming a configurable hardware block based on one or more target functions within the loop comprises instructions for forming a tree of operators that are executed for each loop iteration; wherein the output of a first operator in the tree is used as input to a second operator in the tree.

19. A system for executing a loop, the system comprising:
one or more processors;
a configurable hardware block that is programmable by the one or more processors;
wherein the configurable hardware block is associated with a plurality of registers;
wherein the plurality of registers includes a loopcount register, an input register, and an output register;
one or more non-transitory computer-readable media storing instructions which, in response to being executed by the one or more processors, cause operations comprising:
programming, into hardware of a configurable hardware block, a hardware circuit that performs one or more target functions within the loop, wherein programming reconfigures one or more of:
a programmable interconnect to change how a plurality of logic blocks are connected,
a lookup table, for a particular logic block, to change the output of the particular logic block for a given input, and
a plurality of multiplexors and based on a particular value for a set of bits of a pre-defined plurality of acceptable values for the set of bits, wherein each value of the plurality of acceptable values designates a particular configuration of a pre-defined plurality of configurations of the plurality of multiplexors;
for each iteration of the loop,
(a) updating, in the loopcount register, a counter value that tracks a number of iterations in the loop; and
(b) updating a target value in the output register based at least in part by loading a value from the input register into the hardware circuit of the programmed configurable hardware block.

20. The system of claim 19, further comprising:
an instruction buffer;
wherein the instructions further cause operations comprising:
storing a set of one or more instructions within the loop in the instruction buffer;
for each iteration of the loop,
(a) fetching the set of one or more instructions from the instruction buffer; and
(b) executing the set of one or more instructions based on the updated target value in the output register.

21. The system of claim 20, wherein the instructions further cause operations comprising:
determining, based on the counter value, that a program flow should exit the loop;
in response to determining, based on the counter value, that the program flow should exit the loop, fetching a subsequent instruction in the program flow from a different location than the instruction buffer.

22. The system of claim 19, wherein the input register is the loopcount register.

23. The system of claim 19, wherein the instructions cause the input register to provide at least one input value to the programmed configurable hardware block for each iteration of the loop.

24. The system of claim 19, wherein each register of the plurality of registers is a general purpose register (GPR) of a processor of the one or more processors; wherein instructions for updating, in the output register, a target value using the programmed configurable hardware block comprise instructions for updating the respective GPR.

25. The system of claim 19 wherein the plurality of registers further includes a second output register, the instructions further causing operations comprising updating, in the second output register, a second target value using the programmed configurable hardware block.

26. The system of claim 25 wherein the second target value is updated, based at least in part, on the value in the input register.

27. The system of claim 19 wherein instructions for programming a configurable hardware block based on one or more target functions within the loop comprises instructions for forming a tree of operators that are executed for each loop iteration; wherein the output of a first operator in the tree is used as input to a second operator in the tree.

28. The method of claim 1 wherein a memory-mapped register comprises said set of bits.

29. The method of claim 1 wherein reconfigures the programmable interconnect to change how the plurality of logic blocks are connected comprises reconfigures based on a bit-stream that specifies a configuration of said hardware circuit.

30. The method of claim 29 wherein reconfigures based on a bit-stream comprises receiving a central processing unit (CPU) instruction that references said bit-stream.

* * * * *

UNITED STATES PATENT AND TRADEMARK OFFICE
CERTIFICATE OF CORRECTION

PATENT NO. : 9,557,997 B2  
APPLICATION NO. : 13/947674  
DATED : January 31, 2017  
INVENTOR(S) : Basant et al.

Page 1 of 1

It is certified that error appears in the above-identified patent and that said Letters Patent is hereby corrected as shown below:

On the Title Page

On page 2, Column 1, Item (56), under Other Publications, Line 6, delete "Tighly" and insert -- Tightly --, therefor.

On page 2, Column 1, Item (56), under Other Publications, Line 7, delete "Reconfigureable" and insert -- Reconfigurable --, therefor.

Signed and Sealed this
Eighth Day of August, 2017

Joseph Matal
*Performing the Functions and Duties of the*
*Under Secretary of Commerce for Intellectual Property and*
*Director of the United States Patent and Trademark Office*